United States Patent [19]
Grodinsky

[11] 3,760,255
[45] Sept. 18, 1973

[54] AC TO DC CONVERTER CIRCUIT
[76] Inventor: Robert M. Grodinsky, 4448 W. Howard St., Skokie, Ill. 60076
[22] Filed: Feb. 25, 1972
[21] Appl. No.: 229,374

Related U.S. Application Data
[63] Continuation-in-part of Ser. No. 141,780, May 10, 1971, abandoned.

[52] U.S. Cl.................. 321/8 R, 307/235, 321/47, 330/127, 330/138, 330/140
[51] Int. Cl............................. H02m , H03k , H03f
[58] Field of Search............................. 321/8 R, 47; 324/119, 120; 307/235; 330/127, 138, 140

[56] References Cited
UNITED STATES PATENTS
3,436,676   4/1969   Cook.................................. 330/117
3,402,360   9/1968   Millon................................ 330/140
3,094,673   6/1963   Maupin................................ 330/15
3,343,064   9/1967   Bright............................. 324/120 X Primary Examiner—William H. Beha, Jr.
Attorney—Sidney Wallenstein et al.

[57] ABSTRACT

An AC to DC converter for producing a varying DC signal proportional to the amplitude of the varying AC input signal, the converter including a pair of clamping circuits for providing output signals having DC components proportional to the AC amplitude of the AC input signal and AC components following the AC input signal, and where either the DC or the AC signal components of the outputs of the clamping circuits are of opposite sense while the other of same are of the same sense. Means are provided for combining the clamped signals so that the AC signal components are substantially cancelled and the DC signal components are added together.

18 Claims, 10 Drawing Figures

Patented Sept. 18, 1973
3,760,255
3 Sheets-Sheet 1
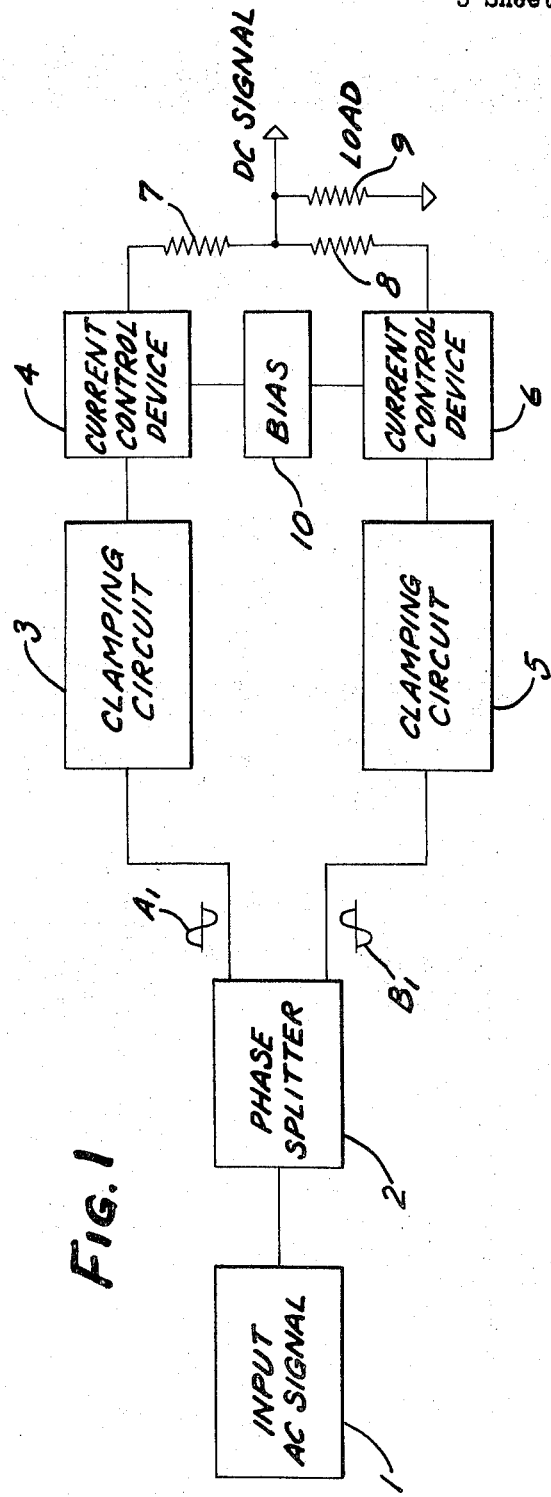
FIG. 1
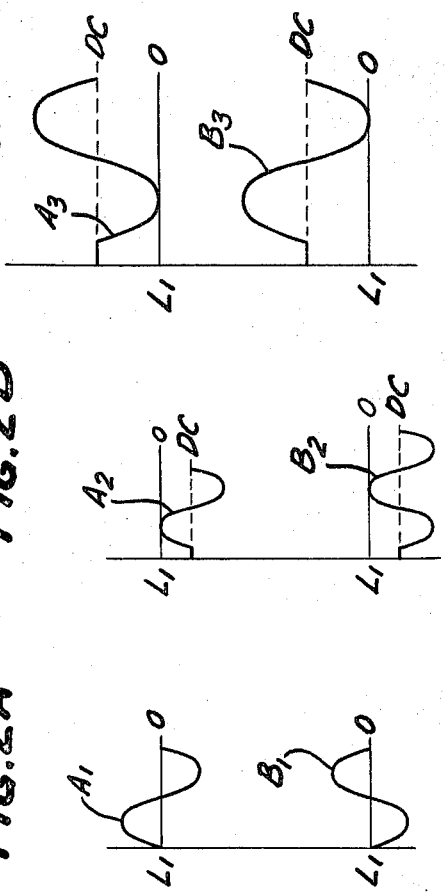
FIG. 2C
FIG. 2B
FIG. 2A
INVENTOR
ROBERT M. GRODINSKY
by: Wallenstein, Spangenberg, Hattis & Strampel
ATTYS.

Patented Sept. 18, 1973 3,760,255

INVENTOR
ROBERT M. GRODINSKY by: Wallenstein, Spangenberg, Hattis & Strampel
ATTYS.

Patented Sept. 18, 1973 3,760,255

AC TO DC CONVERTER CIRCUIT

This application is a continuation-in-part of application Ser. No. 141,780, filed May 10, 1971 now abandoned.

The invention relates to systems for converting an AC (alternating current) signal to a proportional DC (direct current) signal for control or measurement purposes.

In signal processing it is often necessary to derive a DC signal which is proportional to the magnitude of a varying AC signal. Such a DC signal is needed for automatic gain control as used in radios and signal generators. The common practice is to rectify the AC signal so as to produce a DC signal in proportion to the AC signal, and to filter the rectified signal to remove the AC components. When the AC signals are in the frequency range above 100 kilohertz, such systems using rectification and filtering work well particularly as the AC signal frequency increases. However, in the audio range this technique is not successful unless the filter time constants are long. This results in a delay in responding to changes in signal amplitude which produces a large time lag in regulating the gain control function. In the audio range, delays of several seconds are not uncommon. If this delay is unacceptable and shorter time constants are used, the control signal then contains an unfiltered AC component which when applied to the gain control stage produces distortion.

Some circuits have been heretofore developed to produce DC signals proportional to the amplitude of an AC input signal without the time delay problem referred to. However, these circuits are very complicated circuits, such as circuits utilizing transformers and the like making the circuit costly, complicated, and, more importantly, useable only over a limited range of frequencies.

It is the object of this invention to provide a means for producing from a varying AC signal to widely varying frequency (such as over all or an appreciable part of the audio frequency band) a proportional DC signal with little or no AC components and a fast response time to changes in the AC signal level.

Another object of the invention is to provide an improved automatic gain control circuit which is operable over the audio frequency range and is devoid of significant distortion components.

In accordance with the broad aspects of the present invention, the AC input signal involved is applied to a pair of clamping circuits which produce at the output thereof respective signals having DC components proportional to the amplitude of the AC input signal and AC components following the AC input signal. In one form of the invention, the DC components of the clamped signals are of opposite polarity and the AC components are in phase with one another. In another form of the invention, the clamped signals have DC components of the same polarity and AC components of opposite phase. In the former case, relatively inexpensive and commercially available integrated differential amplifier circuits are most advantageously utilized so that by applying the two clamped signals to the respective inputs of the differential amplifier circuits the DC signal components thereof will effectively be added together in the output thereof and the AC signal components will be substantially cancelled out. In the latter case, the clamped signals are fed through respective isolating means having a common load so the oppositely phased AC signal components oppose one another and the DC signal components add together. The isolating means is most advantageously, although not necessarily, a pair of amplifiers feeding a common load circuit. The clamping circuits and the circuits which response to the output signals thereof are relatively simple circuits which do not need transformers and the like (which ordinarily put restrictions on the frequency range capability of the overall circuit especially at the low frequency range) and are operable over a wide frequency range.

The above and other objects of the invention will become apparent upon making reference to the specification, the claims and the drawings wherein:

FIG. 1 is a block diagram of an AC to DC converter circuit incorporating a first form of the invention;

FIGS. 2A, 2B and 2C show the waveforms present in the circuit of FIG. 1 associated with each function performed therein;

Figure 3:
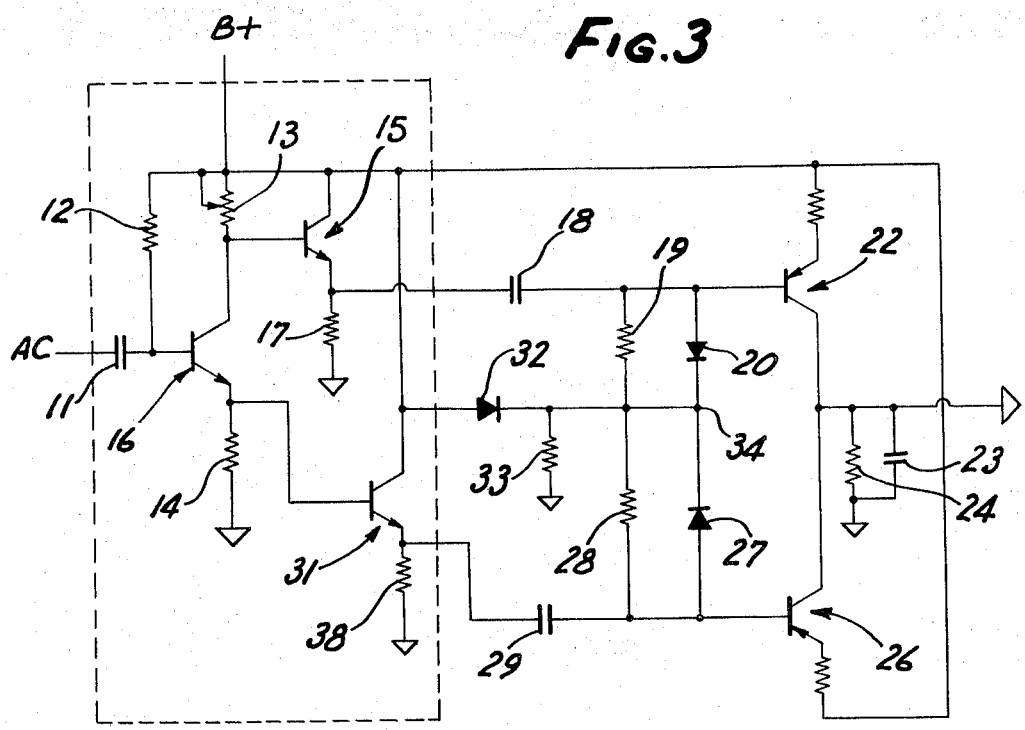
FIG. 3 is a preferred circuit for the circuit indicated in block form in FIG. 1.

Referring now to FIG. 1, there is shown one form of the invention comprising a source 1 of an AC signal fed into a phase splitting circuit 2. The outputs of the phase splitting circuit are AC signals A1 and B1 shown in FIG. 2A corresponding to the input signal and equal in magnitude but opposite in sense or phase. The waveforms A1 and B1 vary above and below a zero reference line. The signals A1 and B1 are fed respectively to conventional clamping circuits 3 and 5 which clamp the signals to a point at or near zero, as shown by waveforms A2 and B2 in FIG. 2B, which also shows the DC component produced by the clamping action. The clamped signals are respectively fed to the control terminals of amplifying current controlling devices 4 and 6 each of which devices are biased by a bias voltage source 10 to a point at or somewhat above the current cut off point thereof. For the circuit as shown, the current control devices 4 and 6 are such that a negative going input signal produces amplification while a positive going signal is not amplified because the amplifier devices are cut off. The DC component of the clamped signals are such as to drive the current control devices 4 and 6 into the more conductive state so that the average value of the load current flowing through a pair of load resistors 7 and 8 connected respectively in the load circuits thereof varies with the average value of the clamped signals A2 and B2. (The output amplified signals are shown in FIG. 2C by waveforms A3 and B3). The currents from the current control devices 4 and 6 are combined in a common load resistor 9.

If the amplifier signals A3 and B3 are added together, the AC derived components thereof are opposite in phase and will therefore cancel. The DC components will, however, add in the common load resistor 9. It is thus apparent that, in the absence of an input AC signal, there will be little or no load current flowing into the common load 9. When an AC signal is present, a DC output signal proportional to the amplitude of the AC signal will be produced at the output.

FIG. 3 shows the preferred circuitry for the block diagram of FIG. 1. In FIG. 3, the AC input signal is coupled through capacitor 11 to the base of an NPN transistor 16 forming part of the phase splitting circuit 2. A resistor 12 connected between the base of transistor 16 and B+ furnishes bias to the transistor. Equal load resistors 13 and 14 are connected between B+ and the collector of transistor 16, on the one hand, and the emitter of transistor 16 and ground, on the other hand, so as to produce signals at the collector and emitter thereof which are equal but opposite in phase. The collector resistor 13 is adjustable to produce exact balance between the two signals. The base of an NPN transistor 15 forming part of an emitter-follower circuit is connected to the collector of transistor 16. Transistor 15 has its collector connected to B+ and the output thereof is taken across a load resistor 17 connected between its emitter and ground. In a similar manner, an NPN transistor 31 forms part of an emitter-follower circuit having its base connected to the emitter of transistor 16, and the output thereof is taken between the emitter of transistor 16 and ground across a resistor 38. The collector of transistor 31 is connected to B+. These emitter follower circuits serve to lower the source impedance of the output thereof connected to drive the clamping circuits in a push pull configuration.

Figure 4:
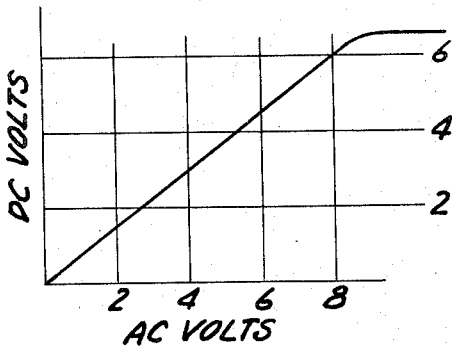
FIG. 4 is a curve of the AC input-DC output characteristic of the circuit of FIG. 3.

The clamping circuits 3 and 5 are composed of a capacitor 18 and a diode 20 connected in series between resistor 17 and a common point 34, and a capacitor 29 and a diode 27 connected in series between resistor 38 and the common bias point 34. Resistors 19 and 28 connected in parallel with diodes 20 and 27 furnish a DC return path for the diodes. PNP transistors 22 and 26 have their bases connected to the anodes of diodes 20 and 27 respectively which anodes are connected to the common bias point 34. Bias for these transistors is derived across a diode 32 and a resistor 33 which form a voltage divider across B+ and ground. Diode 32 is forward biased and developes a fixed voltage drop which is applied to the bases of transistors 22 and 26 through resistors 19 and 28. This voltage drop across diode 32 sets the operating point of these transistors at or near cut off. Since the clamping diodes are referenced to the bias point, conduction of these diodes due to an AC signal will subtract from the bias voltage as the capacitors 18 and 29 charge to the peak negative voltage. The transistors 22 and 26 thus receive a forward DC bias proportional to the magnitude of an applied AC signal when such a signal is present. This forward bias prevents the cut off which would occur for the positive half of the cycle if the clamping circuits were removed. The emitters of transistors 22 and 26 are connected respectively through resistors 25 and 25' to B+. The outputs of transistors 22 and 26 taken at the collectors thereof are added in a common load resistor 24 connected between these collectors and ground. Since the AC components of each amplifier output are out phase, these signals cancel in load resistor 24. The DC components of each amplifier add and appear across the load. A capacitor 23 connected across resistor 24 acts to filter out residual high order components. FIG. 4, which is a graph of the DC output for varying AC inputs of the circuit of FIG. 3, shows a near perfect linearity of the output of the circuit of FIG. 3 up to input voltages of 8 volts.

Figure 6:
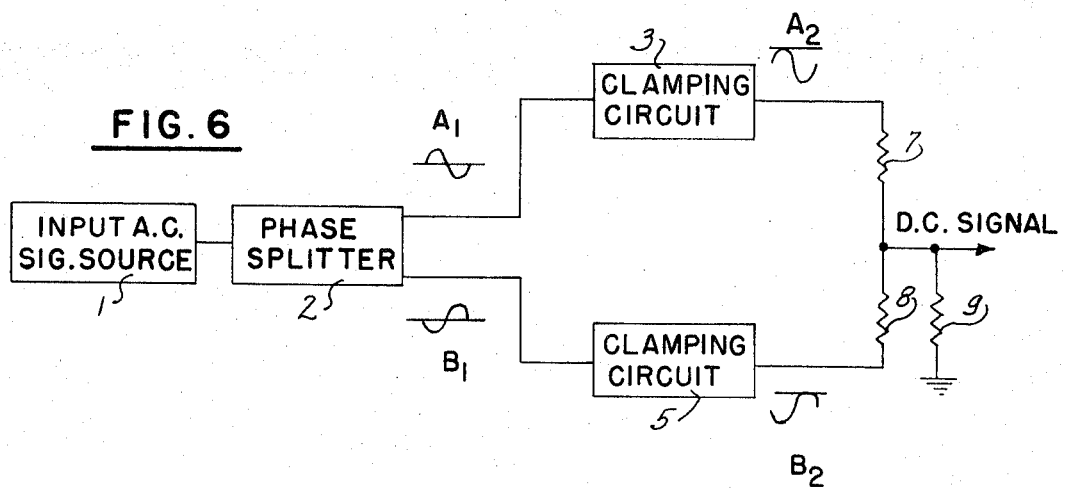
FIG. 6 is a block diagram of the first form of the invention without extra amplification.

FIG. 6 is a modification of the invention as shown in FIG. 1, wherein the output of the clamping circuits 3 and 5 are combined without further amplification. As in FIG. 1, resistors 7 and 8 isolate the clamping circuits from each other and they are combined across a common load 9.

Figure 7:
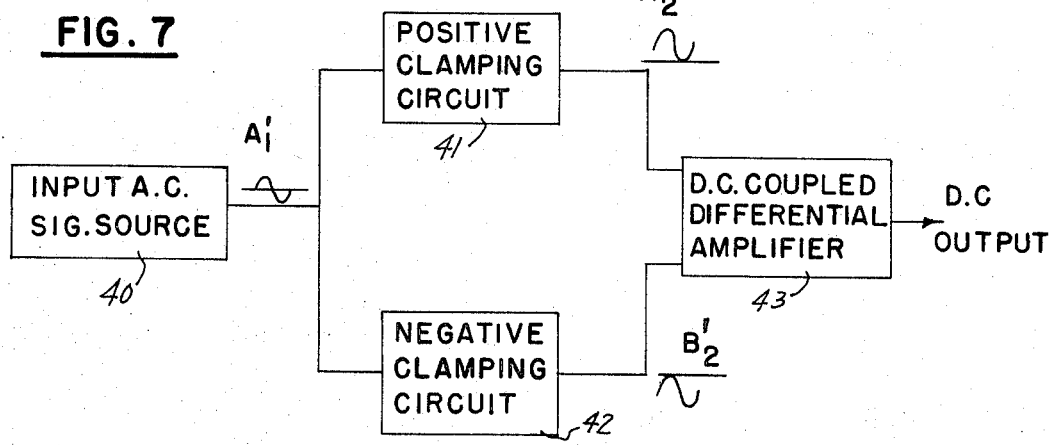
FIG. 7 is a block diagram of an AC to DC converter circuit incorporating a second form of the invention.

In FIG. 7, there is shown the block diagram of another basic form of the invention wherein there is a modification in the nature of the clamping circuits and the manner in which the clamped signals are combined to achieve cancellation of the AC components and addition of the DC components. The AC input signal source 40 providing a signal A1' is coupled to two clamping circuits 41 and 42 which produce clamped signals A2' and B2' with AC components of the same phase (i.e., same sense) and DC signal components of opposite polarity. These clamped signals are fed to the two input terminals of a DC differential amplifier 43. As is well known, such an amplifier amplifies only the difference between the signals which are applied to its inputs. Since the AC output of each of the clamping circuits are of the same sense, i.e., identical in phase and amplitude, they are not amplified while the DC components are of opposite sense and are amplified. Since many types of differential amplifiers are commercially available as integrated circuits, this is an inexpensive method of obtaining a small efficient AC to DC converters.

Figure 8:
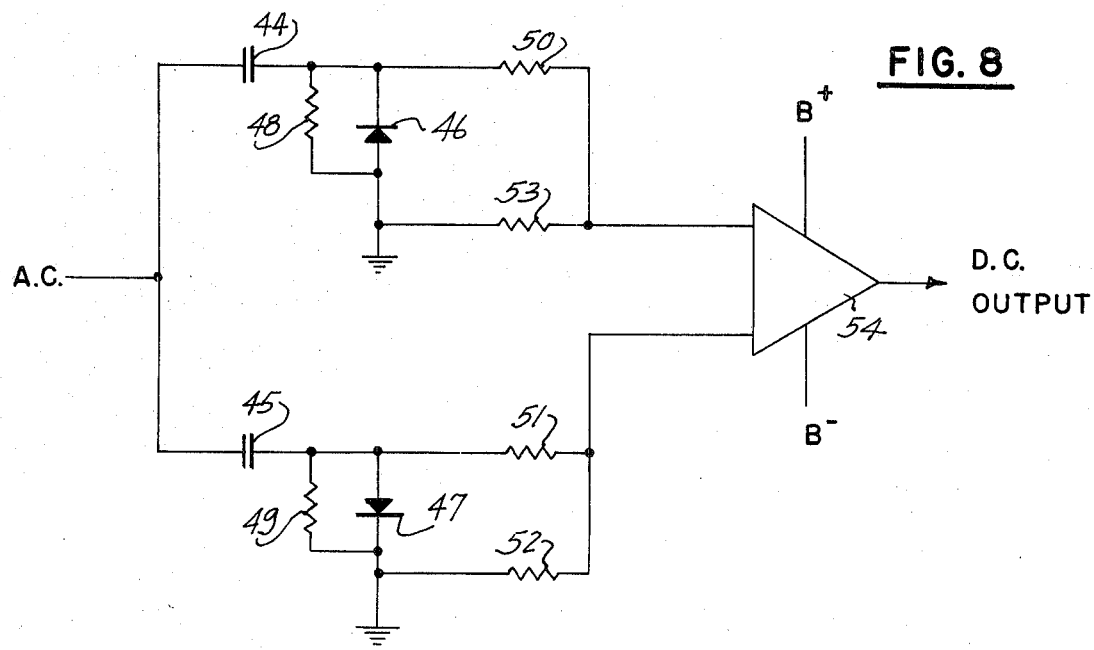
FIG. 8 is a circuit diagram for the second form of the invention indicated in block form in FIG. 7.

FIG. 8 shows the preferred form of the circuit shown in block form in FIG. 7. An AC signal is coupled through capacitors 44 and 45 to clamping circuits composed of diodes 46 and 47 and resistors 48 and 49 as DC return elements. The diodes 46 and 47 are connected in opposite sense from each other so that one produces a negative DC component and the other a positive DC components. Since all practical diodes have a threshold voltage before they conduct, the AC signal applied to the input to the clamping circuits should be large compared to this threshold voltage (e.g., 1 volt AC if germanium diodes are used and 3 volts if silicon diodes are used). Resistors 50 and 53 and 51 and 52 form attenuators so that the amplifier inputs are not overloaded if a high sensitivity amplifier is used. Since the AC components to each input are nearly identical, there will be little or no AC output. The DC components are of opposite polarity and will thus be amplified.

Figure 5:
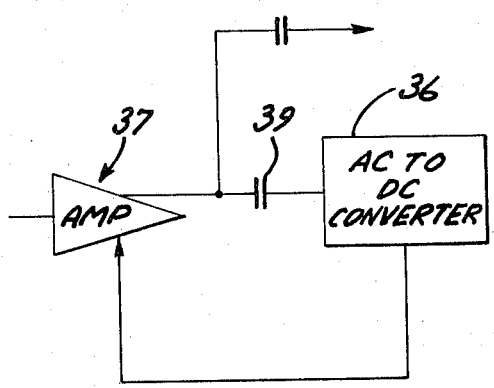
FIG. 5 is an amplifier circuit with the invention forming the signal source of a gain control circuit.

The DC output signal of any of the circuits described can be used as a gain control signal in a conventional gain control amplifier circuit as shown in FIG. 5 to which reference is now made. The amplifier 37 receives an AC signal to be amplified at the input thereof and the output thereof is fed to a suitable load. The output of the amplifier circuit 37 includes the amplified AC signal superimposed on a DC voltage. The AC component may be coupled through a capacitor 39 to the input of any of the AC to DC converter circuits previously described identified by reference numeral 36. The output of the AC to DC converter circuit 36 is connected to a point of the amplifier circuit 37 which controls the gain thereof in any conventional way.

It is apparent that the present invention provides a simple system for producing a DC component from an AC waveform.

It should be understood that numerous modifications may be made in the most preferred form of the invention described without deviating from the broader aspects of the invention.

I claim:

1. A converter circuit for producing a varying DC signal from an AC signal of varying amplitude, said circuit comprising: AC input means, a pair of clamping circuit means having input terminals coupled to said AC input means and output terminals for producing a resultant signal of only one polarity and each including a DC component proportional to the amplitude of said AC signal and an AC component following the waveform of the AC signal, one of said DC and AC components of said clamped signals being of the same sense and the other of same being of the opposite sense, and a combining circuit coupled to said output terminals for providing at the output thereof an output signal where the AC components are substantially cancelled or reduced and the DC components are added together.

2. The converter circuit of claim 1 with the addition of output filtering means coupled to the output of said combining circuit.

3. The converter circuit of claim 1 in combination with an audio amplifier circuit including a gain control portion having a gain control input to which a DC control signal is to be fed for reducing the AC signal output of the audio amplifier circuit in proportion to the magnitude of increase of the DC control signal, the output of said audio amplifier circuit being the AC signal source for said converter circuit, and means for feeding said added DC components at the output of said converter circuit to said gain control input of said audio amplifier circuit.

4. A converter circuit for producing a varying DC signal from an AC signal of varying amplitude, said DC signal being proportional to the amplitude of said AC signal, said circuit comprising: AC signal input means, AC phase splitting means for converting said AC input signal into two signal components each of which is placed in opposition to the other, a pair of clamping circuit means for respectively providing at the output thereof said AC signal components clamped to a given reference level so that the clamped signals contain DC components of the same polarity and AC components of opposite phase, and a combining circuit including means for isolating the outputs of said clamping circuits from a common output terminal and for combining said clamped signals together to substantially cancel or reduce the AC components and provide the addition of the DC components at said common output terminal.

5. The converter circuit of claim 4 with the addition of a pair of impedance transforming means coupled between said CC phase splitting means and said clamping means for driving the inputs to said clamping circuit means from a low impedance source.

6. The converter circuit of claim 4 with the addition of output filtering means coupled to said common output terminal further reducing any residual AC component of said DC output signal.

7. The converter circuit of claim 4 wherein the isolating means include DC amplifying means and said output terminal being at a common load circuit of said amplifier means.

8. The converter circuit of claim 5 with the addition of output filtering means coupled to said common output terminal further reducing any residual AC component of said DC output signal.

9. The converter circuit of claim 4 in combination with an audio amplifier circuit including a gain control portion having a gain control input to which a DC control signal is to be fed for reducing the AC signal output of the audio amplifier circuit in proportion to the magnitude of increase of the DC control signal, the output of said audio amplifier circuit being the AC signal source for said converter circuit, and means for feeding said added DC components at the output of said converter circuit to said gain control input of said audio amplifier circuit.

10. A converter circuit for producing a varying DC signal from an AC signal of varying amplitudes, said DC signal being proportional to the amplitude of said AC signal, said circuit comprising: AC signal input means, a pair of clamping means having inputs coupled to said AC signal input means, said clamping means producing clamped signals at the outputs thereof which have DC components of opposite polarity and in-phase AC components following said AC signals, and differential amplifier means having two input terminals respectively DC coupled to the outputs of said clamping means and an output terminal, said differential amplifier means providing at said output terminal an amplified signal which is functional of the difference of said signal components at said input terminals thereof.

11. The converter circuit of claim 10 with the addition of impedance transforming means coupled between said AC signal input means and said clamping means for driving said pair of clamping means from a low impedance source.

12. The converter circuit of claim 10 wherein the coupling means between said clamping circuits and said differential amplifier means are attenuating means to prevent overload of said differential amplifier means.

13. The converter circuit of claim 10 with the addition of output filtering means coupled to said output terminal of said differential amplifier means reducing any AC components thereat.

14. The converter circuit of claim 10 in combination with an audio amplifier circuit including a gain control portion having a gain control input to which a DC control signal is to be fed for reducing the AC signal output of the audio amplifier circuit in proportion to the magnitude of increase of the DC control signal, the output of said audio amplifier circuit being the AC signal source for said converter circuit, and means for coupling the output terminal of said differential amplifier means of said converter circuit to said gain control input of said audio amplifier circuit.

15. A converter circuit for producing a varying DC signal from an AC signal of varying amplitude, said DC signal being proportional to the value of the AC signal, said circuit comprising, in combination: AC phase splitting means for converting an AC signal input into two signal components each of which is phased in opposition to the other, a pair of current control devices each having a signal input terminal and load terminals wherein the current output is a DC current whose value is a function of the difference between the instantaneous value of a resultant signal fed to the signal input terminal thereof and a current cut-off value, means for establishing a quiescent operating point of the current control devices, a pair of clamping means for respectively clamping said AC signal components to a given reference level so the clamped signals do not vary in polarity but vary only in the direction needed to produce an increase in current output from said current control devices when fed to the signal input terminals thereof, means coupling the signal input terminals of said current control devices respectively to the outputs of said clamping means so that said clamped phase opposed signals are fed thereto, and signal combining means connected to the load terminals of said current control device so the clamped AC signal derived components thereof cancel and the DC components threof add, and output terminal means for coupling said added DC components to another circuit.

16. The converter circuit of claim 15 with the addition of impedance transforming means coupled between said AC phase splitting means and the clamping means for driving the clamping means from a low impedance source.

17. The converter circuit of claim 15 with the addition of output filtering means coupled to the input of said signal reducing any residual AC component of said DC output signal.

18. The converter circuit of claim 15 in combination with an audio amplifier circuit including a gain control portion having a gain control input to which a DC control signal is to be fed for reducing the AC signal output of the audio amplifier circuit in proportion to the magnitude of increase of the DC control signal, the audio output of said audio amplifier circuit being the AC signal source for said converter circuit, and means for feeding said added DC components of said converter circuit to said gain control input of said audio amplifier circuit.

* * * * *